United States Patent [19]

Hausweiler et al.

[11] B  3,925,250

[45]  Dec. 9, 1975

[54] PROCESS FOR PREPARING AN IRON CONTAINING CATALYST

[75] Inventors: Arnold Hausweiler, Zons; Nikolaus Paris; Karl-Heinz Ennenbach, both of Dormagen, all of Germany

[73] Assignee: Erdolchemie Gesellschaft mit beschrankter Haftung, Cologne, Germany

[22] Filed: June 8, 1972

[21] Appl. No.: 260,945

[44] Published under the Trial Voluntary Protest Program on January 28, 1975 as document no. B 260,945.

[30] Foreign Application Priority Data

June 11, 1971   Germany............................ 2128903

[52] U.S. Cl. ............... 252/437; 252/435; 260/465.3
[51] Int. Cl.$^2$............................................. B01J 27/18
[58] Field of Search........................... 252/435, 437

[56] References Cited
UNITED STATES PATENTS

| | | |
|---|---|---|
| 3,171,859 | 3/1965 | Sennewald et al............. 252/437 X |
| 3,226,422 | 12/1965 | Sennewald et al............. 252/437 X |
| 3,264,347 | 8/1966 | Sennewald et al............. 252/437 X |
| 3,497,461 | 2/1970 | McClellan et al................. 252/437 |
| 3,516,789 | 6/1970 | Sennewald et al............. 252/437 X |

*Primary Examiner*—Patrick P. Garvin
*Attorney, Agent, or Firm*—Burgess, Dinklage & Sprung

[57] ABSTRACT

An iron-containing catalyst for making acrylonitrile from propylene, ammonia and oxygen or air is prepared by impregnating a bismuth/phosphorus molybdate catalyst on silica gel with an aqueous solution of an iron salt, drying and calcining the impregnated catalyst for 0.3 to 7 hours at 500°C. to 750°C., the catalyst produced containing bismuth, molybdenum, iron and phosphorus, which comprises impregnating a bismuth/phosphorus molybdate catalyst on silica gel with an aqueous solution of an iron salt, drying and calcining the impregnated catalyst for 0.3 to 7 hours at 500°C. to 750°C.; the catalysts thus produced containing 6 to 26% by weight bismuth; 2 to 20% by weight molybdenum and 0.5 to 10% by weight iron; and having a specific surface of from 4 to 50 m$^2$/g.

9 Claims, No Drawings

PROCESS FOR PREPARING AN IRON CONTAINING CATALYST

BACKGROUND

This invention relates to a process for the production of catalysts for the synthesis of acrylonitrile from propylene, ammonia and oxygen or air in which bismuth/phosphorus molybdate supported catalysts are treated with solutions of iron salts.

A process for producing an iron-modified bismuth/phosphorus molybdate catalyst is described in DOS No. 2,044,830. In this process, a catalyst for acrylonitrile production consisting of bismuth/phosphorus molybdate and silica gel is very finely ground in a ball mill and solutions of ammonium molybdate, iron nitrate, phosphoric acid and silica sol are subsequently added. The active salt solutions and silica sol are added in a definite order to the bismuth/phosphorus molybdate catalyst being processed. This involves a complicated procedure with subsequent granulation of the catalyst by spray drying and then calcination.

It had not been expected from page 3, paragraph 2, of DOS No. 2,044,830 that addition of, for example, of soluble salts of iron to the spent catalyst and subsequent mixing, spray drying and calcining, would give a catalyst suitable for the purposes of the process according to the invention.

SUMMARY

It has now been found that an iron-containing catalyst for the synthesis of acrylonitrile by the reaction of propylene with ammonia and molecular oxygen or air on a supported catalyst containing bismuth, molybdenum, iron and phosphorus can be obtained by impregnating a catalyst of bismuth/phosphorus molybdate on silica gel with an aqueous solution of iron salts, and subsequent drying and calcining for 0.3 to 7 hours at 500° to 750°C; the finished catalysts containing from 6 to 26% by weight of bismuth, from 2 to 20% by weight of molybdenum, from 0.5 to 10% by weight of iron and, optionally, from 0.1 to 1% by weight of phosphorus, and having a specific surface of from 4 to 50 m²/g.

DESCRIPTION

Preferred catalysts are those having catalytically active metal contents within the following limits:

| | |
|---|---|
| bismuth | 15 to 26% by weight |
| molybdenum | 10 to 20% by weight |
| iron | 0.5 to 10% by weight |
| phosphorus | 0.1 to 1.0% by weight |

Particularly preferred catalyst are those of the following composition:

| | |
|---|---|
| bismuth | 20 to 24% by weight |
| molybdenum | 12 to 18% by weight |
| iron | 1 to 4% by weight |
| phosphorus | 0.3 to 0.6% by weight |

The catalysts obtained by the process according to the invention may be prepared from unused or used bismuth/phosphorus molybdate catalysts of the kind described in u.S. Pat. No. 2,904,580 (referred to hereinafter as "Bi—Mo13 P— catalysts"). These catalysts contain, for example, approximately 50% by weight of bismuth/phosphorus molybdate and 50% by weight of silica gel, are spherical by virtue of the fact that they are prepared in spray dryers and have specific surfaces of from 40 to 70 m²/g.

In the process according to the invention, the Bi—Mo—P— catalysts are impregnated with an aqueous solution of an iron salt, preferably iron nitrate. This treatment can be carried out in the additional presence of phosphoric acids and/or an aqueous solution of a readily volatile mineral acid and/or a carboxylic acid which decomposes readily on heating, to yield only gaseous products.

Preferred solutions are aqueous solutions of nitric acid, hydrochloric acid, or mixtures of these; aliphatic carboxylic acids such as dicarboxylic acids and polycarboxylic acids with a maximum of 3 non carboxyl carbon atoms per carboxyl group, for example oxalic acid, malonic acid, succinic acid, glutaric acid, maleic acid, fumaric acid or aconitic acid; oxy and hydroxy carboxylic acids with a maximum of 3 non carboxyl carbon atoms per carboxyl group, for example glycolic acid, hydroxy propionic acid, glyoxylic acid, pyruvic acid, glyceric acid, malic acid, oxaloacetic acid, mesoxalic acid, tartaric acid, citric acid, acetone dicarboxylic acid, saccharic acid, trihydroxy glutaric acid or mucic acid; amino and nitrilo carboxylic acids with a maximum of 3 non carboxyl carbon atoms per carboxyl group, for example asparagic acid, glutamic acid, glycine, hydroxy glutamic acid or nitrilo triacetic acid.

The treatment on which the process according to the invention is based is especially preferably carried out using an aqueous solution of an iron salt to which nitric acid and/or oxalic acid have been added.

The aqueous solution of the iron salt is advantageously sprayed onto the Bi—Mo—P— catalyst in a rotating granulating drum. Since it is desired to obtain a uniform distribution of the iron, a minimum volume of liquid is required. This is from 150 to 500 ml per kg of the dry iron-free catalyst, depending upon the porosity of the catalyst and the size of the sprayed droplets. The following procedure has proved to be particularly advantageous.

Bi—Mo—P—catalyst in a granulating drum is sprayed with for example 30% of its weight of iron nitrate solution to form a wet paste. Catalyst which has already been dried but not calcined is then introduced into this paste with continuous stirring in such a quantity that a non-sticking free-flowing mixture is formed. This is then dried and calcined after the removal of a quantity which will be returned for addition to the next granulation batch.

In cases where the iron-containing catalyst is intended to be used for reaction with short residence times of for example from 1 to 6 seconds relatively high specific surfaces of, for example, from 20 to 50 m²/g, obtained by calcination at temperatures of from 450° to 600°C, are of advantage. By contrast for the type of catalyst intended to be used for reactions with residence times of from 6 to 15 seconds it is of greater advantage to reduce the specific surface to between 5 and 20 m²/g by using calcination temperatures of from 600° to 750°C. The specific surface of the iron-containing catalysts used in the process according to the invention is preferably in the range of from 5 to 30 m²/g.

The iron-containing catalysts thus prepared contain very uniformly distributed iron and have a very smooth surface coupled with a high resistance to abrasion, for example between 1 and 2% by weight when determined in accordance with the method described in DOS No.

2,044,830, page 6.

The catalysts according to the invention may be used for the large-scale synthesis of acrylonitrile by the reaction of propylene with ammonia and molecular oxygen or air at elevated temperatures and at normal or elevated pressures. The catalysts may be used either in a fluidised bed or fixed bed, although they are preferably used in a fluidised bed. In this case, grain sizes of from 10 to 1,000 $\mu$, preferably from 10 to 120 $\mu$, depending upon the residence time and gas velocity, are used. The catalysts can be used for the production of acrylonitrile from propylene, ammonia and oxygen, at temperatures of from 400° to 500°C, preferably from 440° to 490°C, and at pressures of from 1 to about 4 atms., preferably from 1.5 to about 2.5 atms.

A distinct interdependence between the reaction temperatures, residence times and $O_2$-concentrations in the reactor effluent gases must be carefully observed so that optimum results may be obtained. In this way suitable production conditions can be arranged so that the catalysts are used under chosen conditions which are suitable and are held constant. For example, good results are obtained with an iron-containing catalyst calcined at 500°C at a reaction temperature of from 440° to 460°C, with a residence time of 1 to 3 seconds and with 1 to 2% by volume of $O_2$ in the reactor effluent gas. Particularly good results are obtained using an iron-containing catalyst calcined for 1 to 2 hours at 650° to 700°C giving optimum results at a reaction temperature of from 460° to 480°C, a residence time of from 6 to 12 seconds and with, for example, 0.1 to 0.4% by volume of $O_2$ in the reactor effluent gas. Residence times used are generally between 1 and 15 seconds and preferably between 8 and 12 seconds.

Starting gas mixtures with molar ratios of air to propylene to ammonia of 9.0 – 10.5: 1 : 0.9 – 1.1 are suitable for the process. Steam or other diluting gases need not be added to the starting gas.

The yields of acrylonitrile which can be obtained with the catalysts according to the invention can be as high as 75%, based on the propylene used. It was suprising that extremely high yields such as these could be obtained with the catalysts prepared simply by impregnating the bismuth/phosphorus molybdate catalysts with iron salt solutions according to the invention because a useful catalyst obtained in this way had not been expected according to DOS No. 2,044,830.

The process according to the invention has overcome existing preconceptions and is of considerable economic significance to the synthesis of acrylonitrile on an industrial scale. The catalysts according to the invention have an unusually wide range of application and the fact that they can be used for every conceivable embodiment of acrylonitrile reactor at present known for this type of reaction by suitably selecting the production conditions is of very considerable economic significance. Acrylonitrile is used as a well-known monomer starting material for the production of synthetic thermoplastic and elastic polymers. For polymerisation it may be used alone as well as a component for copolymers with for instance 1,3-butadiene, styrene to form rubbers, fibers, etc.

EXAMPLE 1a.

The catalysts according to the invention are preferably prepared by the following procedure:

1,000 g of a bismuth/phosphorus molybdate catalyst which have been produced in accordance with Example 1 of U.S. Pat. Spec. No. 2,904,580, contain from 22 to 24% by weight of bismuth; 12 to 14% by weight of molybdenum; and 0.3% by weight of phosphorus, and has been in use for 20 months in a reactor for the large-scale synthesis of acrylonitrile, are sprayed with a finely atomised solution of 217 g of Fe $(NO_3)_3 \times 9$ $H_2O$ and 7.4 g of $NH_4H_2PO_4$ in 165 ml of water in a granulating drum provided with a fixed screen. After this solution has been sprayed on, the moist paste is kneaded for another 5 to 10 minutes in the granulating drum, and 420 g of a dried catalyst which have also been covered with iron in an earlier run are added after a few minutes, the entire contents of the drum are converted into a "dry" powder which can be readily discharged from the drum. The powder is dried for 8 to 10 hours at 120°C and then part of it is calcined and part returned to be used for the next impregnation cycle in the granulating drum. The finished catalyst contains approximately 23% by weight of bismuth; 13% by weight of molybdenum; 3% by weight of iron; and 0.5% by weight of phosphorus.

For calcination, the iron-containing catalysts were all heated to the calcination temperature from below 100°C over a period of some 30 to 45 minutes. They were then maintained at the calcination temperature for the period indicated in Table 1, after which they were cooled to a temperature of 100° – 150°C below the calcination temperature over a period of about 15 minutes and, finally, further cooled as quickly as required.

EXAMPLE 1b 1,000 g of a bismuth/phosphorus molybdate catalyst which has been produced in accordance with Example 1 of U.S. Pat. Spec. No. 2,904,580, contains 22 to 24% by weight of bismuth; 12 to 14% by weight of molybdenum; and 0.3% by weight of phosphorus, and which has been in use for 20 months in a reactor for the large-scale synthesis of acrylonitrile, are sprayed as in Example 1a with a finely atomised solution of 217 g of Fe $(NO_3)_3 \times 9$ $H_2O$ and 7.4 g of $NH_4H_2PO_4$ in 165 ml of water. The moist paste is then kneaded for 5 to 10 minutes in a granulating drum as in Example 1a, after which it is dried for 8 to 10 hours at 120°C (in the absence of previously dried catalyst) and then calcined as in Example 1a.

The acrylonitrile yields obtained with these catalysts are substantially identical with the yields of the catalysts prepared according to Example 1a.

EXAMPLE 2

The catalysts according to the invention were tested by the following procedure.

200 to 720 ml of catalyst are introduced into a fluidised-bed reactor 40 mm in diameter. A preheated mixture of air, propylene and ammonia is introduced from below at 440° to 490°C and the pressure at the head of the reactor is maintained at a chosen value between 0.3 and 0.9 atms. The residence time is adjusted by suitable selection of the starting quantity, the quantity of catalyst and the reactor pressure. The reaction tube is externally surrounded by a fluidised sand bed for heating and for dissipating heat. The reaction gases issuing from the reactor are passed through cold 0.1 HCl, to absorb all the water-soluble products which are then determined in this solution by gas chromatography. The required $O_2$-content in the reactor effluent is adjusted by suitable selection of the air/propylene ratio and is constantly monitored during the test.

EXAMPLES 3 TO 20

The bismuth/phosphorus molybdate catalysts listed in Table 1, some of which had already been used whilst others were fresh, are worked up by the addition of iron, in accordance with Example 1. The iron-containing catalysts obtained are also specified in Table 1.

The iron-containing catalysts listed in Table 1 are subjected under the test conditions set out in Table 2 where the yield of acrylonitrile is also tabulated.

nation at 700°C for 1.5 hours. Testing under the conditions of Example 10 gives a 72.7% yield of acrylonitrile.

EXAMPLE 22

1,000 g of a bismuth/phosphorus molybdate catalyst which had been produced in accordance with Example 1 of U.S. Pat. Spec. No. 2,904,580, contains approximately 23% by weight of bismuth; 13% by weight of molybdenum and 0.3% by weight of phosphorus, and which has been in use for 20 months in a reactor for the large-scale synthesis of acrylonitrile, are sprayed with a Table 1

| Example No. | Bi-Mo-P-Catalysts before treatment | | Catalysts after treatment | | | | | |
|---|---|---|---|---|---|---|---|---|
| | Condition of catalyst | Specific surface $m^2/g$ | Production Composition | | | | Calcination conditions Hours/°C | Specific surface $m^2/g$ |
| | | | Bi % | Mo % | Fe % | P % | | |
| 3 | 20 months– old | 44 | 23 | 13 | 0.5 | 0.3 | 4/500 | 38 |
| 4 | | | 23 | 13 | 0.5 | 0.3 | 4/500 | 38 |
| 5 | | | 23 | 13 | 0.5 | 0.3 | 4/500 | 38 |
| 6 | | | 23 | 13 | 0.5 | 0.3 | 1/700 | 8 |
| 7 | | | 23 | 13 | 2.0 | 0.5 | 4/500 | 34 |
| 8 | | | 23 | 13 | 2.0 | 0.5 | 4/500 | 34 |
| 9 | do. | do. | 23 | 13 | 2.0 | 0.5 | 2/600 | 18 |
| 10 | | | 23 | 13 | 2.0 | 0.5 | 1/700 | 9 |
| 11 | | | 23 | 13 | 2.5 | 0.5 | 1.5/700 | 6 |
| 12 | | | 23 | 13 | 2.5 | 0.5 | 1.2/700 | 8 |
| 13 | do. | do. | 23 | 13 | 2.5 | 0.5 | 1.5/700 | 6 |
| 14 | | | 23 | 13 | 2.5 | 0.5 | 1.5/700 | 6 |
| 15 | do. | do. | 23 | 13 | 3.5 | 0.5 | 1.5/700 | 6 |
| 16 | | | 24 | 14 | 3.0 | 0.5 | 2.0/700 | 7 |
| 17 | fresh | 63 | 24 | 14 | 3.0 | 0.5 | 2.0/700 | 7 |
| 18 | | | 24 | 14 | 3.0 | 0.5 | 2.0/700 | 7 |
| 19 | fresh | 73 | 15 | 10 | 1.5 | 0.3 | 2.0/700 | 9 |
| 20 | fresh | 60 | 25 | 20 | 5.0 | 0.6 | 2.0/700 | 8 |

Table 2

Testing of the catalysts produced in accordance with Table 1

| Example No. | °C | atms. | Test Conditions residence time secs. | molecular ratio air : $C_3H_6$ : $NH_3$ | $O_2$ in the reactor effluent gas % by volume | Yield of acrylonitrile using Bi-Mo-P-catalysts before treatment | using catalysts after treatment |
|---|---|---|---|---|---|---|---|
| 3 | 430 | 0.4 | 8 | 11 : 1 : 1.2 | 1.2 | 56 | 61 |
| 4 | 470 | 0.4 | 2 | 11 : 1 : 1.2 | 1.2 | | 60.5 |
| 5 | 460 | 0.4 | 5 | 11 : 1 : 1.2 | 0.15 | | 64 |
| 6 | 460 | 0.4 | 8 | 10 : 1 : 1.1 | 0.15 | | 67 |
| 7 | 420 | 0.4 | 7 | 11 : 1 : 1 | 0.20 | | 62 |
| 8 | 440 | 0.4 | 4 | 11 : 1 : 1 | 0.15 | | 63.5 |
| 9 | 450 | 0.4 | 5 | 10 : 1 : 1.1 | 0.15 | do. | 68 |
| 10 | 460 | 0.4 | 8 | 9.5:1 : 1.1 | 0.15 | | 72 |
| 11 | 465 | 0.4 | 8 | 10.4:1 : 1.2 | 0.10 | | 74.6 |
| 12 | 440 | 0.4 | 3 | 11 : 1 : 1.2 | 0.13 | | 67 |
| 13 | 465 | 0.4 | 8 | 10.4:1 : 1.2 | 0.10 | do. | 73.4 |
| 14 | 450 | 0.4 | 2 | 11 : 1 : 1.2 | 1.0 | | 69 |
| 15 | 465 | 0.4 | 8 | 10.3:1 : 1.2 | 0.10 | do. | 73.8 |
| 16 | 465 | 0.4 | 8 | 10.4:1 : 1.2 | 0.10 | | 75.0 |
| 17 | 450 | 0.4 | 6 | 10.9:1 : 1.2 | 0.60 | 61 | 72.2 |
| 18 | 440 | 0.4 | 4 | 11 :1 : 1.2 | 0.90 | | 71.7 |
| 19 | 465 | 0.4 | 8 | 10.3:1 : 1.1 | 0.10 | 54 | 69.1 |
| 20 | 465 | 0.4 | 8 | 10.3:1 : 1.2 | 0.10 | 59 | 70.8 |

EXAMPLE 21

1,000 g of a bismuth/phosphorus molybdate catalyst which has been produced in accordance with Examples 1 of U.S. Pat. Spec. No. 2,904,580, contains approximately 23% by weight of bismuth; 13% by weight of molybdenum; 0.3% by weight of phosphorous and which has been in use for 20 months in a reactor for the large-scale synthesis of acrylonitrile, are sprayed with a solution of 217 g of Fe $(NO_3)_3 \times 9\ H_2O$, 100 ml of 35% $HNO_3$ and 80 ml of water in accordance with the procedure described in Example 1 and further processed as described in that Example. This is followed by calcination at 700°C for 1.5 hours. Testing under the conditions of Example 10 gives a 72.7% yield of acrylonitrile.

solution of 217 g of Fe $(NO_3)_3 \times 9\ H_2O$, 7.4 g of $NH_4H_2PO$ and 80 g of oxalic acid in 120 ml of water in accordance with the procedure of Example 1 and further processed as described in that Example. This is followed by calcination for 1.5 hours at 690°C. Test gave 66.3% yields of acrylonitrile under the conditions of Example 8, 73.1% yields of acrylonitrile under the conditions of Example 10 and 69.4% yields of acrylonitrile under the conditions of Example 18.

What is claimed is:

1. Process for preparing an iron-containing catalyst for the synthesis of acrylonitrile by the reaction of propylene with ammonia and molecular oxygen or air on a supported catalyst containing bismuth, molybdenum, iron and phosphorus, which consists essentially of
   a. impregnating a bismuth/phosphorus molybdate catalyst on silica gel with an aqueous solution of an iron salt;
   b. drying and calcining the impregnated catalyst for 0.3 to 7 hours at 500°C. to 750°C.;
   c. the catalysts thus produced consisting essentially of catalytically active metal contents as follows:
      6. to 26% by weight bismuth;
      2 to 20% by weight molybdenum
      0.5 to 10% by weight iron and
      0.1 to 1% by weight phosphorus;
   and having a specific surface of from 4 to 50 m²/g.

2. Process of claim 1 wherein the catalyst produced consists essentially of catalytically active metal contents as follows:
   from 20 to 24% by weight bismuth;
   12 to 18% by weight molybdenum;
   1 to 4% by weight iron; and
   0.3 to 0.6% by weight phosphorus
and has a specific surface of from 5 to 30 m²/g.

3. Process of claim 1 wherein the catalyst is calcined at 650° to 700°C. for 1 to 2 hours.

4. Process of claim 1 wherein said aqueous solution used for impregnating said catalyst is an acidic solution.

5. Catalyst for preparing acrylonitrile by the reaction of propylene with ammonia and molecular oxygen or air consisting essentially of a bismuth/phosphorus molybdate catalyst on silica gel impregnated with an aqueous solution of an iron salt, dried and calcined for 0.3 to 7 hours at 500°C. to 750°C. and consisting essentially of catalytically active metal contents as follows:
   6 to 26% by weight bismuth,
   2 to 20% by weight molybdenum,
   0.5 to 10% by weight iron, and
   0.1 to 1% by weight phosphorus,
and having a specific surface of from 4 to 50 m²/g.

6. Catalyst of claim 5 wherein said calcining temperature is 650° to 700°C.

7. Catalyst of claim 5 which consists essentially of catalytically active metal contents as follows:
   15 to 26% by weight bismuth,
   10 to 20% by weight molybdenum,
   0.5 to 10% by weight iron and
   0.1 to 1% by weight phosphorus.

8. Catalyst of claim 5 which consists essentially of catalytically active metal contents as follows:
   20 to 24% by weight bismuth,
   12 to 18% by weight molybdenum,
   1 to 4% by weight iron, and
   0.1 to 0.6% by weight phosphorus
and a specific surface of from 5 to 30 m²/g.

9. Process for preparing an iron-containing catalyst for the synthesis of acrylonitrile by the reaction of propylene with ammonia and molecular oxygen or air on a supported catalyst containing bismuth, molybdenum, iron and phosphorus which consists essentially of
   a. impregnating a bismuth/phosphorus molybdate catalyst on silica gel with an aqueous solution of an iron salt;
   b. drying and calcining the impregnated catalyst for 0.3 to 7 hours at 650° to 700°C;
   c. the catalyst thus produced consisting essentially of catalytically active metal contents as follows:
      6 to 26% by weight bismuth;
      2 to 20% by weight molybdenum
      0.5 to 10% by weight iron and
      0.1 to 1% by weight phosphorus;
   and having a specific surface of from 4 m²/g to 50 m²/g.

* * * * *